United States Patent
Nauth et al.

(12)

(10) Patent No.: US 6,689,402 B1
(45) Date of Patent: Feb. 10, 2004

(54) METHODS FOR MANUFACTURE OF FAT-FREE CREAM CHEESE

(75) Inventors: K. Rajinder Nauth, Wheeling, IL (US); David Hayashi, Chicago, IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/285,874

(22) Filed: Mar. 31, 1999

(51) Int. Cl.⁷ ................................................. A23C 9/12

(52) U.S. Cl. ............................. 426/36; 426/34; 426/42; 426/43; 426/582; 426/585

(58) Field of Search ............................ 426/34, 36, 580, 426/583, 38, 39, 40, 41, 582, 585, 43

(56) References Cited

U.S. PATENT DOCUMENTS

| | | |
|---|---|---|
| 3,929,892 A | 12/1975 | Hynes et al. |
| 4,169,160 A | 9/1979 | Wingerd et al. |
| 4,243,684 A * | 1/1981 | Pruss et al. .................... 426/40 |
| 4,244,983 A | 1/1981 | Baker |
| 4,379,175 A | 4/1983 | Baker |
| 4,724,152 A | 2/1988 | Baker et al. |
| 4,919,943 A | 4/1990 | Yee et al. |
| 5,064,660 A | 11/1991 | Silver |
| 5,079,024 A | 1/1992 | Crane |
| 5,087,471 A | 2/1992 | Combes et al. |
| 5,180,604 A | 1/1993 | Crane et al. |
| 5,213,827 A | 5/1993 | Nauth et al. |
| 5,516,543 A | 5/1996 | Amankonah et al. |

OTHER PUBLICATIONS

Covacevich and Kosikowski, "Mozzarella and Cheddar Manufacture by Ultrafiltration Principles", Journal of Dairy Science, vol.61, issued 1978, pp. 701–709.
Vascovo et al., Plasma–encoded Ropiness Production, 11:709–712, 1989, Biotechnology Letters.
Macura et al., Scandanavian ropy Milk Identification and Characterization of Endogenous Rody Lactic J treptococci and their Extracellular Excretion, *J. Dairy Sci.*, 67:735–744 (1984).

* cited by examiner

*Primary Examiner*—Leslie Wong
(74) *Attorney, Agent, or Firm*—Fitch, Even, Tabin & Flannery

(57) ABSTRACT

The present invention provides a process for making a fat-free cream cheese-like fermentation product having similar textural and organoleptic properties similar to that of a higher fat containing cream cheese. In the process, a skim milk composition having a high solids content and a low fat content is cultured with a ropy culture until the pH reaches a value of about 5.2 to about 4.9. The cultured mixture is blended with at least one bulking agent and at least one emulsifier to form a blend, which is heated to a temperature of about 60° C. to about 65° C. After adding a vegetable gum, the heating is continued until a temperature of about 80° C. to about 90° C. is reached. The heated mixture is blended and homogenized to form the fat-free cream cheese-like fermentation product. The present composition and process does not require the addition of relatively costly cottage cheese solids or curds as required by conventional cream cheese processes. The fat-free cream cheese-like fermentation product has comparable firmness, consistency, and flavor of a conventional higher-fat cream cheese.

27 Claims, 1 Drawing Sheet

Figure
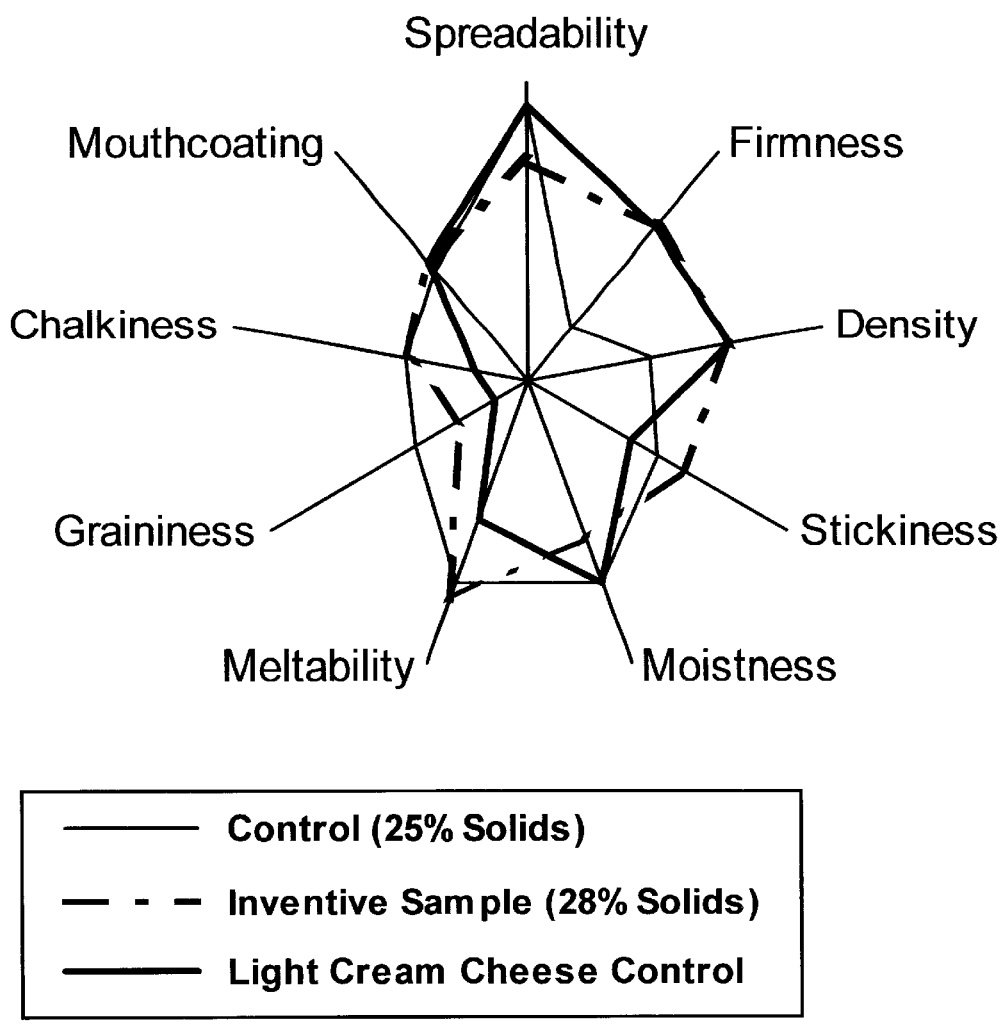

US 6,689,402 B1

METHODS FOR MANUFACTURE OF FAT-FREE CREAM CHEESE

FIELD OF THE INVENTION

The present invention is directed to non-fat cream cheese products and methods for manufacturing such non-fat cream cheese products. The non-fat cream cheese products of the present invention have creamy non-syneresing texture and aromatic flavor similar to that of fat-containing cream cheese.

BACKGROUND OF THE INVENTION

Cream cheese is a soft, mild acid-coagulated uncured cheese made from a mixture of cream and milk. Cream cheese is a dry, soft, pliable curd, which is used for cheesecake, salads, dips, and spreads. The flavor of conventional cream cheese is described as slight acid and nutty often with a hint of diacetyl. Cream cheese is stored under refrigeration conditions and the body of cream cheese is smooth and butter-like. The texture and body of cream cheese at refrigeration temperatures is such that the cream cheese can be sliced and spread. In making conventional cream cheese, sweet whole milk and/or skim milk and sweet cream are blended in pre-selected proportions to form a cream cheese mix. The cream cheese mix normally has a butterfat content of from about 10 percent to about 14 percent. After culturing, the finished cream cheese has a butterfat content of from about 33 percent to about 35 percent. Reduced fat or "light" cream cheese products can be produced from proportionately lower-fat cream cheese mixes; although such "light" cream cheese products generally have excellent flavor and texture, they still retain a relatively high butterfat content.

In manufacture, a conventional cream cheese mix is first pasteurized and homogenized. After cooling (usually to a temperature between 62° F. and 92° F.), it is inoculated with a conventional lactic acid culture. Rennet may be used to aid the coagulation of the mixture. It is held at the inoculation temperature until it has ripened and a coagulum is formed. The total acidity of the coagulum is typically from about 0.6 percent to about 0.9 percent (calculated as percent equivalent lactic acid); the pH is generally about 4.1 to about 4.9.

After the desired acidity is obtained, the curd is separated from the whey and is thereafter packaged. One well known process for making cream cheese and separating cream cheese curd from whey includes a mechanical separation of the curd from the whey such as disclosed in U.S. Pat. No. 2,387,276 to Link. In accordance with the method of the Link patent, after the mix is ripened to form a coagulum, the coagulum is heated to an elevated temperature to break the viscosity of the mix. The heated mix is centrifuged at the elevated temperature to separate the curd from the whey. Such conventional cream cheese has a characteristic, smooth, creamy consistency and delicate taste and aroma.

There has been considerable effort directed to providing cream cheese type products which have the texture, smoothness and organoleptic properties of cream cheese, but which are fat-free or have very significantly reduced levels of fat. Low fat, low calorie foods which look and taste similar to their full fat, higher calorie counterparts are desirable alternative products for consumers. Researchers in the food industry have concentrated on developing food products which are nutritious and palatable, containing substantially reduced levels of high calorie, fat-containing ingredients. This is particularly true in the dairy industry where low calorie, low-fat products such as skim milk, yogurt and reduced fat ice cream have been successfully marketed.

The high fat levels in some dairy products, such as cream cheese (with a fat content of at least about 33 percent) or "light" cream cheese (with a fat content of at least about 16.5 percent) have been thought to be important in maintaining a desirable creamy mouthfeel and characteristic flavor, and to avoid the grainy texture associated with some low fat cream cheese products. Nevertheless, significant effort has been devoted to developing imitation cream cheese products which contain reduced fat levels. Examples of such efforts are disclosed in U.S. Pat. No. 2,161,159 to Lundstedt et al. and U.S. Pat. No. 3,929,892 to Hynes et al. However, the fat content of the cream cheese products produced by such methods still exceeds about 10 percent fat. It would be desirable to reduce the fat content well below 10 percent.

Efforts have been made to develop very low butterfat content imitation cream cheese products having low calorie content. U.S. Pat. Nos. 4,244,983 and 4,379,175 to Baker describe imitation cream cheese products having butterfat content of less than about 2 percent, and which have about 60 calories per serving. However, U.S. Pat. No. 4,724,152 describes use of soft, unripened cultured cheese curd, such as cottage or bakers cheese curd, in a low fat product. According to this patent, the resulting products do not closely duplicate the desired creamy and full-bodied consistency of full fat cream cheese. More recently, U.S. Pat. No. 5,079,024, to Crane, and U.S. Pat. No. 5,180,604, to Crane et al., describe manufacture of fat-free cream cheese from concentrated skim milk, dry cottage cheese curd, gums and bulking agents, which are homogenized to provide a fat-free cream cheese product. However, while these processes provide desirable products, they typically involve multiple mixing steps and the use of relatively expensive cottage cheese curd, which adds to the cost of the fat-free cream cheese product.

There are many functions of lactic acid bacteria in cheese, including acid production, development of curd strength, enhancement of cheese yield, dissociation of colloidal calcium phosphate, proteolysis in cheese, production of antimicrobials, control of certain non-starter organisms and pathogens, and flavor development. (See, e.g., Nauth, K. R., Cheese, Dairy Science Technology Handbook, Vol. 2, Y. H. Hui (Ed) VCH Publishers, New York, p. 174, 1993.) These functions are more or less common to all lactic acid bacteria starter cultures which include mesophilic (*Streptococcus lactis, S. cremoris* and *S. diacetylactis*) and thermophilic (*Streptococcus thermophilus, L. bulgaricus, L. helveticus* and *L. lactis*) culture organisms. However, within the diversity of these organisms there exist strain(s) which have additional characteristics such as fermentation of citrate with the production of diacetyl and $CO_2$.

Another property of certain strains of lactic starter bacteria is the production of slime-forming exocellular polysaccharides (EPS), also termed "ropiness", which is typically undesirable in most dairy fermentations. Ropy characteristics in lactic starter cultures are known to adversely affect routine processing operations in dairy fermentations, thereby resulting in economic losses to the industry. For example, during cheese manufacture, a ropy condition in a starter may adversely affect acid production and curd formation, resulting in texture defects.

Bacterial cells may synthesize exocellular polysaccharides in two basic forms, either as a capsule intimately associated with the cell surface, or secreted into the environment. In some cases, both capsular and unattached polysaccharides are produced by the same microbe. Distinguishing between the two forms can be difficult. (Cerning, J., Exopolysaccharides Produced by Lactic Acid Bacteria, *FEMS Microbiol. Rev.*, 87:113–130, 1990.) Depending on their structural relationship to the bacterial cell, they have been variously referred to as slime, capsular or microcapsular polysaccharides. The term exopolysaccharides (EPS) (as proposed by Sutherland, I. W., Bacterial Exopolysaccharides, *Adv. Microbial Physiol.*, 8:143–212, 1972) provides a general term for all these forms of bacterial polysaccharides found outside the cell wall.

There are a number of sugars detected in EPS produced by *S. thermophilus* and *L. bulgaricus*. For example, Cerning (1990) showed that EPS of ropy *L. bulgaricus* contains galactose, glucose and rhamnose in approximate molar ratio of 4:1:1; whereas ropy *S. thermophilus* contains only galactose and glucose. When cultures of *S. thermophilus* were propagated in milk, the EPS was found to contain galactose, glucose and n-acetyl-galactosamine in a ratio of 2:1:1.

The terminology "exocellular-polysaccharide" is used interchangeably with "ropiness/mucoidness" in relation to lactic acid bacteria. (Vedamuthu, et al., Involvement of a Plasmid in Production of Ropiness (See, e.g., Mucoidness in Milk Cultures by *Streptococcus cremoris, MS. Appl. Environ. Microbiol.*, 51:677–682, 1986; Schellhaas, et al., Rheological and Scanning Electron Microscopic Examination of Skim Milk Gels Obtained by Fermenting with Ropy and Non-Ropy Strains of Lactic Acid Bacteria, *Food Microstructure*, 4:279–287 (1985); Ranganathan, et al., Studies on Factors Affecting Ropiness in *Streptococcus Lactis, Milchwissenschaft*, 34:333–335, 1979; Voscovo, et al., Plasma-Encoded Ropiness Production in *Lactobacillus casei* ssp. *casei, Biotechnology Letters*, 11:709–712, 1989; Macura, et al., Scandinavian Ropy Milk-Identification and Characterization of Endogenous Ropy Lactic Streptococci and their Extracellular Excretion, *J. Dairy Sci.*, 67:735–744, 1984.)

Although EPS-producing organisms in milk have been known for over 150 years (Julie, A. T., Rheological and Microstructural Characteristics of Yogurt Made with Exopolymer-Producing Cultures, Ph.D. Thesis, 1990, University of Minnesota) it is only recently that ropy cultures have been used to produce certain types of yogurt without the addition of stabilizers. Galesloot et al., Manufacture of Stirred Yogurt of High Viscosity, *Voedingsmiddelen Technologie*, 2:446–448, 1968, describe a process for using a ropy culture in the manufacture of yogurt. The use of ropy cultures of thermophilic lactic bacteria, *Streptococcus thermophilus* and *Lactobacillus bulgaricus*, increases the viscosity of yogurt and decreases the susceptibility to synergists. Ropy milk is also produced by some members of the aerogenous group or additional lactic streptococci, such as *S. lactis* var. *taette* and *S. lactis* var. *hollandicus*.

Ropy milk of bacterial origin is well known, but is usually considered to be detrimental. The ropiness may be evident only as a slightly abnormal viscosity or it may be so pronounced that the affected milk may be drawn out in long fine threads, and in some instances may assume a gel-like consistency. The ropiness is due to the formation by the bacteria of gums and mucins such as EPS, probably due to the fermentation of the lactose to galactan and dextran. The development of ropiness is closely associated with capsule formation by the bacteria. In many cases, the capsule appears to be degraded as fast as it is formed, as extensive dissolution of outer cell walls occurs and the gummy material is diffused throughout the milk. Such a condition may accompany an unusual proliferation of bacteria or a formation of long-tangled masses of bacterial cells as threads or chains.

There remains a need in the dairy industry to provide a non-fat cream cheese type product, having the appearance, taste, consistency and texture of fat-containing cream cheese. There is further a need to provide improved methods for making an imitation cream cheese product having substantially no fat, and to provide methods for making the imitation cream cheese product that are adapted to economical, large scale commercial operations. There is also a need to provide a non-fat cream cheese like product that avoids the use of a cottage cheese product. The present invention provides a non-fat cream cheese like product that meets these needs.

SUMMARY OF THE INVENTION

The present invention provides a process for making a fat-free cream cheese-like product. In the process, a skim milk composition having a high solids content is combined with a source of fat such as cream to form a mixture in which the fat content is less than about 1.5 percent. This mixture is cultured with a ropy culture until the pH reaches a value of about 5.2 to about 4.9. The cultured mixture is blended with a bulking agent (e.g., corn syrup solids) and/or an emulsifier (e.g., sodium tripolyphosphate) to form a blend, which is heated to a temperature of about 60° C. to about 65° C. A composition including a vegetable gum is then added, and the heating is continued until a temperature of about 80° C. to about 90° C. is reached. The heated mixture is blended and homogenized to form the fat-free cream cheese-like product, which does not include a cottage cheese composition, and which has the firmness, consistency and flavor of a cream cheese.

Examples of ropy cultures which produce exopolysaccharides in situ include, for example, microorganisms such as *Lactococcus lactis* ssp. *lactis, Lactococcus cremoris, Lactococcus lactis* ssp. *lactis* var. *diacetylactis, Streptococcus thermophilus, Lactobacillus bulgaricus, Lactobacillus lactis, Lactobacillus helveticus, Lactobacillus casei* and subspecies, *Lactobacillus acidophilus*, Leuconostoc species, other lactic acid bacteria, and mixtures thereof as well as cultures producing exopolysaccharides.

Examples of bulking agents useful in the present invention include corn syrup, corn syrup solids, modified starch, pectins, microreticulated cellulose, tapioca, waxy maize, potato starch, and mixtures thereof. The bulking agent is generally used to tie up moisture. Furthermore, the emulsifier may be chosen from among sodium tripolyphosphate, disodium phosphate, sodium acid pyrophosphate, sodium citrate, sodium metaphosphate, ammonium phosphate, ammonium citrate, and mixtures thereof. Additionally, the vegetable gum may be a carrageenan, xanthan, locust bean gum, guar gum, cellulose, methycellulose, and mixtures thereof. In a preferred embodiment, manganese or manganese in combination with citrates may be added. Suitable forms of manganese include, for example, manganese carbonate, manganese acetate, manganese sulfate, manganese chloride, as well as mixtures thereof. Citrate can be added as citric acid, sodium citrate, ammonium citrate, as well as mixtures thereof. Such citrate salts may also act as emulsifiers.

The invention additionally provides the fat-free cream cheese-like product obtained using the process of the invention.

BRIEF DESCRIPTION OF THE DRAWING

The FIGURE graphically illustrates the various sensory attributes (i.e., textural and organoleptic properties) of the inventive cream cheese with two control samples. Each radial axis represents a different sensory attribute ranging from 1 at the origin to 9 at the end of each radial axis. The relative ranks used for each of the sensory attributes are provided in Table 7 of Example 5.

DETAILED DESCRIPTION OF THE INVENTION

Generally, the present invention is directed to methods for making substantially fat-free cream cheese products. It also relates to the fat-free cream cheese product compositions prepared using such methods. The present methods employ pasteurized and concentrated skim milk having a high concentration of solids as the starting material. For example, a pasteurized skim milk retentate having a solids content in the range of from about 25 percent to about 28 percent is preferred. Such a pasteurized skim milk retentate will normally contain about 0.8 to about 2.3 percent lactose, about 18 to about 24 percent milk protein, from about 71 to about 75 percent water, and less than about 1.7 percent milkfat, based on the total weight. Examples of such high solids skim milk compositions include, for example, ultrafiltration retentate of skim milk, skim milk concentrate, reconstituted non-fat milk solids, and other dry or liquid milk protein concentrates.

Further in accordance with the present invention the pasteurized concentrated skim milk is cultured with an exopolysaccharide-producing ("ropy") and diacetyl-producing cream cheese culture microorganisms. While separate microorganisms may be utilized to produce exopolysaccharides and diacetyl, "ropy" cultures of mesophilic lactic acid, fermentative bacteria such as "ropy" *Streptococcus diacetylactis* may also be utilized which produce both diacetyl and exopolysaccharides. The use of ropy cultures in the present low fat, reduced fat and no-fat cream cheese products is important in that it provides a fat-like mouthfeel, texture, and consistency. It furthermore permits the manufacture of a fat-free cream cheese without substantial addition of relatively expensive components (e.g., cottage cheese solids or curds) intended to provide texture and consistency.

Preferably, the culture medium will be a mixture of cream cheese microorganisms selected from among mesophilic and thermophilic lactic acid producing bacteria. While different microorganisms may be utilized to produce exopolysaccharides and diacetyl, "ropy" cultures of mesophilic lactic acid, fermentative bacteria such as "ropy" *S. diacetylactis* may also be utilized which produce both diacetyl and exopolysaccharides.

Commonly in the manufacture of reduced fat or fat-free cheeses, such as reduced fat cream cheese or fat-free cream cheese, a skim milk composition having a solids content up to about 24 percent of solids is used. In the present invention, in contrast, a skim milk composition having a high solids content, such as ultrafiltration skim milk retentate with 25–28 percent solids, is employed. As used herein, the terms "high solids content", "high concentration of solids", and synonymous terms, are intended to designate dairy liquid compositions whose solids content is at least about 22 percent. The high solids skim milk composition is combined with a fat containing substance, such as dairy cream, while maintaining the fat level in the retentate such that the fat level in the finished cream cheese is less than 1.5 percent fat (the current United States standard of identity for a fat-free product). Of course, if the standard of identity should change or be different in other jurisdictions, the fat content of the finished product may conform to the different standards of identity. This mixture is fermented with a ropy viscosity-causing mesophilic culture(s) consisting of *Lactococcus lactis* ssp. *lactis* or *cremoris* strains along with *L. lactis* ssp. *lactis* var. *diacetylactis* and leuconostocs. The retentate can also be fermented with thermophilic lactic cultures (for example, cultures containing any of *S. thermophilus, Lactobacillus bulgaricus, L. lactis, L. helveticus*, or mixtures of any of them) along with a Leuconostoc. The retentate is fermented at a temperature in the range 18°–35° C., preferably at about 23° C., for a time sufficient to attain a pH of about 5.2 to about 4.9, and preferably a pH of about 5.0, whereby the culture generally has a total acidity of about 1.8 percent to about 2.2 percent, preferably about 2.0 percent. Normally the fermentation is carried out for about 16 to 18 hours in order to obtain the desired pH. This acidified culture is then blended with suitable bulking agents and emulsifiers. This mixture is heated to a temperature of about 60° C. to about 65° C.; preferably, the mixture is heated to a temperature of about 63° C. At this moderate temperature, the mixture is blended with a second composition containing a vegetable gum to form a second mixture, which is then further heated to a temperature of about 80° C. to about 90° C.; preferably it is heated to a temperature of about 85° C. This heated mixture is blended and homogenized to form the fat-free cream cheese-like product of the invention. Importantly, the product does not include a cottage cheese composition (e.g., cottage cheese solids or curd), and has the firmness, consistency, and flavor normally associated with a conventional light cream cheese which has a significantly higher fat content.

Optional ingredients which may be used in the present fat-free cream cheese product include, for example, nonfat dry milk (provides additional milk solids to improve rheology and texture), titanium dioxide (opaqueness), calcium proprionate (anti-mold agent), colorants, flavorants, and the like. These additives preferably incorporated into the fat-free cream cheese along with the gum additive.

The skim milk composition may be an ultrafiltration retentate of skim milk, an ultrafiltration/diafiltration retentate of skim milk, a skim milk concentrate, reconstituted non-fat milk solids, other dry or liquid milk protein concentrates (e.g., MPC 70 which contains about 70 percent protein). The skim milk composition has a high solids content, preferably a solids content of about 25 percent to about 28 percent total solids. The ropy culture may include microorganisms such as *Lactococcus lactis* ssp. *lactis, Lactococcus cremoris, Lactococcus lactis* ssp. *lactis* var. *diacetylactis, Streptococcus thermophilus, Lactobacillus bulgaricus, Lactobacillus lactis, Lactobacillus helveticus, Lactobacillus casei* and subspecies, *Lactobacillus acidophilus*, Leuconostoc species, other lactic acid bacteria, and mixtures thereof as well as cultures producing exopolysaccharides.

Further in this process, the bulking agent may be corn syrup, corn syrup solids, modified starch, pectins, microreticulated cellulose, tapioca, waxy maize, potato starch, and mixtures thereof. The bulking agent is generally used to tie up moisture. Furthermore, the emulsifier may be chosen from among sodium tripolyphosphate, disodium phosphate, sodium acid pyrophosphate, sodium citrate, sodium metaphosphate, ammonium phosphate, ammonium citrate, and mixtures thereof.

A vegetable gum is added after the initial heat treatment. Suitable vegetable gums include, for example, carrageenan, xanthan, locust bean gum, guar gum, cellulose, methycellulose, and mixtures thereof. Other additives can be added as desired. Such additives include, for example, non-fat dry milk, preservatives, titanium dioxide, colorings, flavorings, or mixtures thereof. Of course, other additional convention additives known in the cheese-making art can be added if desired. These additives are preferably added at the same time as the vegetable gum. Particular additives that appear to be especially desirable (due to their effect on flavor) include manganese or a mixture of manganese and citrate. Suitable forms of manganese include, for example, manganese carbonate, manganese acetate, manganese sulfate, manganese chloride, as well as mixtures thereof. Citrate can be added as citric acid, sodium citrate, ammonium citrate, as well as mixtures thereof. Such citrate salts may also act as emulsifiers.

The cream cheese like product obtained by this process exhibits yield stress values (measuring spreadability) ranging from about 8,000 to about 13,000 dynes/cm$^2$ compared to the value for light cream cheese of about 15,000 dynes/cm$^2$. Overall flavor, firmness, and chalkiness scores for the samples were also close to an conventional light cream cheese. Higher salt levels (i.e., between about 0.4 and about 0.7 percent) in the fat-free cream cheese product appears to enhance overall cream cheese flavor.

The fat-free cream cheese-like fermentation product of this invention generally contains (1) a concentrated skim milk composition; (2) a source of fat such that the fat content in the fat-free cream cheese-like fermentation products is less than 1.5 percent; (3) a ropy culture; (4) a bulking agent at a level of about 4 to about 8 percent, and preferably at about 5.5 to about 6.5 percent; (5) an emulsifier at a level of about 0.6 to about 1.3 percent, and preferably at about 0.9 to about 1.0 percent; and (6) a vegetable gum at a level of about 0.2 to about 1.0 percent, and preferably at about 0.4 to about 0.7 percent. The present fat-free cream cheese-like fermentation products do not require, and preferably do not contain, cottage cheese components (i.e., cottage cheese solids and/or curd). The fat-free cream cheese fermentation products of the present invention has firmness, consistency and flavor comparable to a conventional cream cheese having significantly higher fat content (i.e., a light cream cheese and, in some cases, a fat-fat cream cheese).

It is generally believed that diacetyl along with other volatile compounds (e.g., ethanol and acetone) are important for flavor development in cultured dairy products such as buttermilk, sour cream and cream cheese. For at least one culture (i.e., culture 353), the addition of manganese, and especially manganese and citrate, enhances diacetyl production (see Example 6).

The present no-fat cream cheeses are prepared without cottage cheese components (i.e., cottage cheese solids or curd). Elimination of such cottage cheese components results in a simpler, more predictable, more reproducible, and more straightforward process. In addition, the elimination or reduction of the cottage cheese components also results in cost savings Moreover, the flavor of the resulting cream cheese like product is pleasing to the consumer even with the absence of, or only low amounts, of cottage cheese components. Generally, it is preferred that no cottage cheese components are present in the present invention. Small amounts (generally less than about 5–10 percent) of cottage cheese or baker cheese components can be used if desired.

The following examples are intended to illustrate the invention and not to limit it. Unless otherwise specified, all percentages are by weight.

EXAMPLE 1

Fat-free Cream Cheese Like Product

Skim milk ultrafiltration retentate at about 28 percent solids (76.6 lbs) is heat treated at 145° F. (63° C.) for 30 minutes and then tempered to about 23° C. The retentate is inoculated with a mesophilic culture containing ropy strains of Streptococcus lactis, S. cremoris, S. diacetylactis and Leuconostoc (obtained from Quest International, Rochester, Minn.). At the time of inoculation, the total culture population is about $5.0 \times 10^6$ cfu/g. The retentate is allowed to ferment in a quiescent state for 16–18 hours. When its pH and total acidity reach 5.0 and 2.00 percent, respectively, the fermented retentate is blended with 5.96 lbs of corn syrup solids, 429 grams of sodium tripolyphosphate, and 244 grams of salt in a Breddo mixer at 2200 rpm for 3 minutes. This blend is then heated with live culinary steam at 50 psi to 63° C. At this point, 5.3 lbs of nonfat dry milk, xanthan (220 g), carrageenan (70.5 g), potassium sorbate (27 g), calcium propionate (21.4 g), titanium dioxide (139.5 g), Vitamin A and oleoresin paprika are added and thoroughly blended. With continued addition of steam, the temperature of the blend reaches 85° C. At this point the steam is turned off and the mix is allowed to stir for 3 minutes. The heated mix is homogenized at 5000 psi, packaged hot, and allowed to cool.

EXAMPLE 2

Evaluation of Control and Ropy Fermentations Used in a Cream Cheese Product

Products were made with two cultures: (1) Mauri (Marui Laboratories, Australia), the non-ropy control, and (2) the ropy culture 353 (Quest International, Rochester, Minn.). Two ultrafiltration retentate concentrations were used: 25 percent total solids (designated Mauri-25 and 353-25), and 28 percent total solids (designated Mauri-28 and 353-28). Chemical and physical profiles of the products are presented in Table 1. The culture volatiles (i.e, ehtanol, acetone, and diacetyl) were measured by gas chromatography. The firmness or speadability of the cream chesses products were measured as the force (in grams) required to physically spread the products. The adhesion of the cream chesses products were measured as the force (in grams) required to physically pull away from the products.

TABLE 1

Chemical and Physical Analysis

|  | Mauri-25 | 353-25 | Mauri-28 | 353-28 |
| --- | --- | --- | --- | --- |
| Fat (%) | 0.7 | 0.9 | 0.8 | 0.8 |
| Moisture (%) | 71.3 | 71.6 | 68.9 | 68.8 |
| pH | 5.24 | 5.19 | 5.25 | 5.15 |
| Salt (%) | 0.81 | 0.71 | 0.73 | 0.74 |
| Ethanol (ppm) | 10 | 61 | 4 | 58 |
| Acetone (ppm) | 1 | 1 | 1 | 1 |
| Diacetyl (ppm) | 17 | 12 | 23 | 7 |
| Firmness (g) | 106 | 74 | 198 | 323 |
| Adhesive (g) | 21 | 15 | 35 | 53 |

The non-ropy control (Mauri) and the ropy culture (353) provide products that have comparable chemical properties, including flavor-producing volatile components, and comparable physical properties. Firmness and adhesion are, however, modulated by both solids content and culture type.

EXAMPLE 3

Compositions of Mixtures Employed in Cottage Cheese Containing Cream Cheese and Ropy Cream Cheese The ingredients included in the mixtures yielding a conventional fat-free cream cheese (prepared with cottage cheese components) and the ropy cultured cream cheese of the invention are compared in Table 2. The GP911 gum is κ-carrageenan obtained from FMC Corp., Philidelphia, Pa.

TABLE 2

Ingredients of Fat-Free Cream Cheese Compositions

| Ingredients | Conventional % | Conventional % Solids | Ropy Culture % | Ropy Culture % Solids |
|---|---|---|---|---|
| Skim milk retentate (25% solids) | 49.6 | 12.4 | 76.6 | 20.7 |
| Dry Cottage Cheese Curd | 33.1 | 6.6 | — | — |
| Steam or Water | 8.8 | — | 8.8 | — |
| Non Fat Dry Milk | 5.3 | 5.1 | 5.3 | 5.1 |
| Sodium Tripolyphosphate | 0.9 | 0.9 | 0.9 | 0.9 |
| Sugar | 0.8 | 0.8 | 0.8 | 0.8 |
| Corn Syrup Solids | — | — | 6.0 | 4.6 |
| Salt | 0.4 | 0.4 | 0.5 | 0.5 |

TABLE 2-continued

Ingredients of Fat-Free Cream Cheese Compositions

| Ingredients | Conventional % | Conventional % Solids | Ropy Culture % | Ropy Culture % Solids |
|---|---|---|---|---|
| Titanium dioxide | 0.3 | 0.3 | 0.3 | 0.3 |
| Xanthan gum | 0.5 | 0.5 | 0.5 | 0.5 |
| GP911 (gum) | 0.2 | 0.1 | 0.2 | 0.1 |
| Potassium Sorbate | 0.06 | 0.06 | 0.06 | 0.06 |
| Calcium Propionate | 0.05 | 0.04 | 0.05 | 0.05 |
| Vitamin A | 0.02 | <0.02 | 0.02 | <0.02 |
| Oleoresin Paprika | 0.001 | <0.001 | 0.001 | <0.001 |

EXAMPLE 4

Properties of Batches of Ropy Cultured Cream Cheese

A control culture (Mauri) and four batches of ropy cultured cream cheese were produced with ropy culture 353 as described in Example 2 using the formulations shown in Table 3. The properties of the resulting batches are presented in Table 4; a reference batch of commercially available light cream cheese is also included in Table 4. The physical properties of the ropy cultured cream cheese of the present invention are comparable to those of the reference light cream cheese. It is significant that the yield stress values for the four batches of ropy cultured cream cheese (Batches 2–5) approach the value found in the light cream cheese reference, whereas the yield stress for the control (i.e., Batch 1) falls far short of that found with the light cream cheese reference. Flavor and texture panel results for these five batches and for light cream cheese are shown in Tables 5 and 6, respectively. A minimum of five trained sensory panelists evaluated each product using a 1 (least desirable) to 9 (most desirable) rating system. The various flavor and texture attributes of the four batches (Batches 2–5) of the invention are comparable to those found for light cream cheese. In particular, overall flavor, firmness, and chalkiness of the inventive samples are closely similar to that for light cream cheese.

TABLE 3

Ingredients of Fat-Free Cream Cheese Compositions

| Ingredients | Batch 1 (Mauri control) % | Batch 1 % Solids | Batch 2 (Ropy) % | Batch 2 % Solids | Batch 3 (Ropy) % | Batch 3 % Solids | Batch 4 (Ropy) % | Batch 4 % Solids | Batch 5 (Ropy) % | Batch 5 % Solids |
|---|---|---|---|---|---|---|---|---|---|---|
| Skim milk retentate 25% solids | 82.7 | 22.3 | 82.7 | 22.3 | 82.5 | 22.3 | 76.8 | 20.7 | 76.6 | 20.7 |
| Steam or Water | 8.8 | — | 8.8 | — | 8.8 | — | 8.8 | — | 8.8 | — |
| Non Fat Dry Milk | 5.3 | 5.1 | 5.3 | 5.1 | 5.3 | 5.1 | 5.3 | 5.1 | 5.3 | 5.1 |
| Sodium Tripolyphosphate | 0.9 | 0.9 | 0.9 | 0.9 | 0.9 | 0.9 | 0.9 | 0.9 | 0.9 | 0.9 |
| Sugar | 0.8 | 0.8 | 0.8 | 0.8 | 0.8 | 0.8 | 0.8 | 0.8 | 0.8 | 0.8 |
| Corn Syrup Solids | — | — | — | — | — | — | 6.0 | 4.6 | 6.0 | 4.6 |
| Salt | 0.4 | 0.4 | 0.4 | 0.4 | 0.5 | 0.5 | 0.4 | 0.4 | 0.5 | 0.5 |
| Titanium dioxide | 0.3 | 0.3 | 0.3 | 0.3 | 0.3 | 0.3 | 0.3 | 0.3 | 0.3 | 0.3 |
| Xanthan gum | 0.5 | 0.5 | 0.5 | 0.5 | 0.5 | 0.5 | 0.5 | 0.5 | 0.5 | 0.5 |
| GP911 (gum) | 0.12 | 0.1 | 0.2 | 0.1 | 0.2 | 0.1 | 0.2 | 0.1 | 0.12 | 0.1 |
| Potassium Sorbate | 0.06 | 0.06 | 0.06 | 0.06 | 0.06 | 0.06 | 0.06 | 0.06 | 0.06 | 0.06 |
| Calcium Propionate | 0.05 | 0.04 | 0.05 | 0.04 | 0.05 | 0.04 | 0.05 | 0.04 | 0.05 | 0.04 |

TABLE 4

Chemical and Physical Analysis

| | Batch Number 1 | Batch Number 2 | Batch Number 3 | Batch Number 4 | Batch Number 5 | Light Cream Cheese |
|---|---|---|---|---|---|---|
| Fat(%) | 1.5 | 1.5 | 1.6 | 1.1 | 1.1 | — |
| Moisture (%) | 69.3 | 69.1 | 68.9 | 66.0 | 65.2 | — |
| pH | 5.41 | 5.25 | 5.23 | 5.26 | 5.23 | — |
| Salt (%) | 0.7 | 0.7 | 0.9 | 0.7 | 0.9 | — |
| Ethanol (ppm) | 2 | 15 | 29 | 19 | 19 | — |

TABLE 4-continued

Chemical and Physical Analysis

|  | Batch Number | | | | | Light Cream Cheese |
|---|---|---|---|---|---|---|
|  | 1 | 2 | 3 | 4 | 5 | |
| Acetone (ppm) | 1 | <1 | 1 | 1 | <1 | — |
| Diacetyl (ppm) | 21 | 11 | 10 | 9 | 9 | — |
| Firmness (g) | 169 | 336 | 359 | 408 | 357 | 240 |
| Penetration (mm) | 15.7 | 11.5 | 11.5 | 11.1 | 11.5 | 15.2 |
| Yield Stress (dyne/cm$^2$) | 4267 | 8747 | 9661 | 8889 | 12,043 | 15,131 |

TABLE 5

Flavor Panel Results

|  | Batch Number | | | | | Light Cream Cheese |
|---|---|---|---|---|---|---|
|  | 1 | 2 | 3 | 4 | 5 | |
| Overall Flavor | 5.1 | 5.3 | 5.8 | 5.7 | 6.2 | 7.3 |
| Aroma | 4.7 | 4.7 | 4.4 | 5.0 | 4.5 | 5.6 |
| Sour Dairy | 3.3 | 3.5 | 4.4 | 5.0 | 4.5 | 5.6 |
| Sweet Dairy | 4.4 | 4.3 | 4.5 | 4.8 | 4.9 | 4.8 |
| Cooked Milk | 3.4 | 3.5 | 3.5 | 3.1 | 3.8 | 2.9 |
| Buttery | 3.9 | 3.1 | 3.8 | 3.5 | 3.8 | 5.7 |
| Chemical | 2.6 | 3.1 | 2.4 | 2.7 | 2.2 | 1.6 |
| Sweetness | 2.9 | 2.7 | 3.0 | 2.4 | 3.2 | 4.0 |
| Saltness | 2.9 | 2.7 | 3.0 | 2.4 | 3.2 | 4.2 |
| Bitterness | 2.2 | 2.4 | 1.8 | 2.0 | 2.0 | 1.8 |
| Rate of Release | 6.0 | 5.8 | 5.9 | 5.2 | 5.5 | 5.6 |

TABLE 6

Texture Flavor Panel Results

|  | Batch Number | | | | | Light Cream Cheese |
|---|---|---|---|---|---|---|
|  | 1 | 2 | 3 | 4 | 5 | |
| Spreading | 8.3 | 7.7 | 7.7 | 7.6 | 7.6 | 7.9 |
| Firmness | 2.4 | 5.1 | 5.4 | 5.3 | 5.4 | 5.3 |
| Density | 3.0 | 3.2 | 3.2 | 4.2 | 3.3 | 2.3 |
| Stickiness | 3.0 | 3.2 | 3.2 | 4.2 | 3.3 | 2.3 |
| Graininess | 1.4 | 1.7 | 1.6 | 1.7 | 1.4 | 1.3 |
| Moistness | 5.5 | 5.2 | 5.1 | 4.6 | 5.2 | 5.2 |
| Melt | 6.7 | 5.1 | 5.7 | 5.2 | 5.6 | 5.7 |
| Chalkiness | 2.7 | 2.4 | 3.0 | 2.5 | 2.2 | 2.0 |
| Mouthcoating | 3.3 | 4.0 | 3.9 | 4.6 | 4.0 | 3.4 |

EXAMPLE 5

Organoleptic Properties of Control Cream Cheeses and Ropy Cream Cheese

Several organoleptic properties of three cream cheese compositions are presented graphically in the Figure. Each axis runs from a value of 1 at the origin to a value of 9 at its terminal end. Two 5 control samples are shown: (1) Control using Mauri 25 (25 percent solids) of Tables 1 and 3 and (2) the light cream cheese of Tables 4–6. The inventive sample (i.e., ropy cultured cream cheese) was the sample shown as Batch 5 in Table 2. The relative ranking scale used for the sensory attributes illustrated in the Figure are provided in the following Table 7:

TABLE 7

Scale for Sensory Analysis Illustrated in FIG.

| Sensory Attribute | Value = 1 | Value = 9 |
|---|---|---|
| Spreadability | least spreadable | most spreadable |
| Firmness | soft | firm |
| Stickiness | not sticky | very stickily |
| Moistness | not moist | very most |
| Meltability | no melt | extreme melt |
| Graininess | not grainy | very grainy |
| Chalkiness | not chalky | very chalky |
| Mouthcoating | none | very much |

This Figure indicates that product attributes of fat-free cream cheese made with 28 percent retentate solids and ropy culture 353 are close to those of a light cream cheese (moisture 62 percent, fat 24.2 percent, salt 1.2 percent, pH 4.6). Firmness and spreadability and overall flavor are generally the more important attributes of cream cheese products.

EXAMPLE 6

Microbiological Profile of Cultures

The microbiological populations present after culturing a control batch and the 353 inventive batch for 18 hours are shown in Table 8 for cultures conducted at two concentrations of total solids, 25 percent and 28 percent. In Table 8, "TA" refers to percent total acidity, "Lactic" refers to mesophilic *Lactococcus lactis* ssp. *lactis/cremoris*, "SD" refers to *Lactococcus lactis* ssp. *lactis* var. *diacetylactis*, and "CAF" refers to citrate fermenting Leuconostoc. It is seen that the inventive culture 353 develops higher acidity, and culture CAF to a higher cell density than does the Mauri control.

TABLE 8

Evaluation of Ropy Culture 353

| | Solids | Variables at 18 hours | | | | |
|---|---|---|---|---|---|---|
| Culture | (%) | pH | TA | Lactic | SD | CAF |
| Mauri | 25 | 5.26 | 1.72 | $1.6 \times 10^9$ | $1.1 \times 10^8$ | $7.0 \times 10^6$ |
| 353 | 25 | 5.00 | 2.16 | $2.2 \times 10^9$ | $4.5 \times 10^7$ | $1.1 \times 10^8$ |
| Mauri | 28 | 5.30 | 1.84 | $1.5 \times 10^9$ | $4.5 \times 10^8$ | $3.1 \times 10^6$ |
| 353 | 28 | 5.18 | 2.10 | $3.1 \times 10^9$ | $6.0 \times 10^7$ | $7.3 \times 10^7$ |

EXAMPLE 7

Optimization of the Yield of Diacetyl Flavorant

Culture 353 was fermented in the absence and presence of manganese and citrate. The results are shown in Table 9. Compared to the controls (i.e., no added manganese), diacetyl production is enhanced in the presence of manganese, and is optimally produced in the presence of manganese (as manganese sulphate) and citrate (as sodium citrate).

TABLE 9

Production of Diacetyl Flavorant

| Manganese (%) | Citrate (%) | Diacetyl (ppm) |
|---|---|---|
| 0 | 0 | 12 |
| 0.01 | 0 | 18 |
| 0 | 0.1 | 12 |
| 0.01 | 0.1 | 24 |

We claim:

1. A process for making a fat-free cream cheese-like product, said process comprising the steps of:
   (i) providing a skim milk composition having a high solids content;
   (ii) combining the skim milk composition with a source of fat to form a dairy mixture;
   (iii) culturing the dairy mixture with a ropy culture until the pH reaches a value of about 5.2 to about 4.9 to form a first cultured mixture;
   (iv) blending the first cultured mixture with at least one bulking agent and at least one emulsifier to form a second cultured mixture;
   (v) heating the second cultured mixture to a first temperature of about 60° C. to about 65° C. to form a third cultured mixture;
   (vi) blending the third cultured mixture with a vegetable gum to form a fourth cultured mixture;
   (vii) heating, with mixing, the fourth cultured mixture to a second temperature of about 80° C. to about 90° C. to form a fifth cultured mixture;
   (viii) homogenizing the fifth cultured mixture to form the fat-free cream cheese-like product,
   wherein the fat-free cream cheese-like product does not include a cottage cheese component, and wherein the fat content of the fat-free cream cheese-like product is less than about 1.5 percent.

2. The process described in claim 1, wherein the skim milk composition is chosen from the group consisting of an ultrafiltration retentate of skim milk, an ultrafiltration/diafiltration retentate of skim milk, a skim milk concentrate, reconstituted non-fat milk solids, dry milk protein concentrate, liquid milk protein concentrate, and mixtures thereof.

3. The process described in claim 2, wherein the skim milk composition contains about 25 percent to about 28 percent total solids.

4. The process described in claim 2, wherein the source of fat is dairy cream.

5. The process described in claim 2, wherein the ropy culture produces exopolysaccharides.

6. The process described in claim 5, herein the ropy culture comprises microorganisms chosen from the group consisting of *Lactococcus lactis* ssp. *lactis, Lactococcus cremoris, Lactococcus lactis* ssp. *lactis* var. *diacetylactis, Streptococcus thermophilus, Lactobacillus bulgaricus, Lactobacillus lactis, Lactobacillus helveticus, Lactobacillus casei* and subspecies, *Lactobacillus acidophilus*, Leuconostoc species, other lactic acid bacteria, and mixtures thereof.

7. The process described in claim 2, wherein the bulking agent is chosen from the group consisting of corn syrup, corn syrup solids, modified starch, pectins, microreticulated cellulose, tapioca, waxy maize, potato starch, and mixtures thereof.

8. The process described in claim 2, wherein the emulsifier is chosen from the group consisting of sodium tripolyphosphate, disodium phosphate, sodium acid pyrophosphate, sodium citrate, sodium metaphosphate, ammonium phosphate, ammonium citrate, and mixtures thereof.

9. The process described in claim 2, wherein the vegetable gum is chosen from the group consisting of carrageenan, xanthan, locust bean gum, guar gum, cellulose, methycellulose, and mixtures thereof.

10. The process described in claim 2, wherein the first temperature is about 63° C.

11. The process described in claim 10, wherein the second temperature is about 85° C.

12. The process described in claim 2, wherein the fourth cultured mixture further comprises an additive chosen from the group consisting of non-fat dry milk, a preservative, titanium dioxide, coloring, flavoring, and mixtures thereof.

13. The process described in claim 2, wherein the fat-free cream cheese-like product contains in situ produced exopolysaccharides and has a yield stress of about 8,000 to about 13,000 dynes/cm$^2$.

14. The process described in claim 2, wherein the skim milk composition includes manganese or a mixture of manganese and citrate.

15. A fat-free cream cheese-like fermentation product comprising:
   (1) a concentrated skim milk composition;
   (2) a source of fat such that the fat content in the fat free cream cheese-like fermentation product is less than 1.5 percent;
   (3) a ropy culture;
   (4) a bulking agent;
   (5) an emulsifier; and
   (6) a vegetable gum,
   wherein the fat-free cream cheese-like fermentation product does not include a cottage cheese component, wherein the fat-free cream cheese-like fermentation product has less than about 1.5 percent fat.

16. The product described in claim 15, wherein the skim milk composition is chosen from the group consisting of an ultrafiltration retentate of skim milk, an ultrafiltration/diafiltration retentate of skim milk, a skim milk concentrate, reconstituted non-fat milk solids, dry milk protein concentrate, liquid milk protein concentrate, and mixtures thereof.

17. The product described in claim 16, wherein the skim milk composition contains about 25 percent to about 28 percent total solids.

18. The product described in claim 16, wherein the source of fat comprises dairy cream.

19. The product described in claim 16, wherein the ropy culture produces exopolysaccharides.

20. The product described in claim 19, wherein the ropy culture comprises microorganisms chosen from the group consisting of *Lactococcus lactis* ssp. *lactis, Lactococcus cremoris, Lactococcus lactis* ssp. *lactis* var. *diacetylactis, Streptococcus thermophilus, Lactobacillus bulgaricus, Lactobacillus lactis, Lactobacillus helveticus, Lactobacillus casei* and subspecies, *Lactobacillus acidophilus*, Leuconostoc species, other lactic acid bacteria, and mixtures thereof.

21. The product described in claim 16, wherein the bulking agent is chosen from the group consisting of corn syrup, corn syrup solids, modified starch, pectins, microreticulated cellulose, tapioca, waxy maize, potato starch, and mixtures thereof.

22. The product described in claim 16, wherein the emulsifier is chosen from the group consisting of sodium tripolyphosphate, disodium phosphate, sodium acid pyrophosphate, sodium citrate, sodium metaphosphate, ammonium phosphate, ammonium citrate, and mixtures thereof.

23. The product described in claim 16, wherein the vegetable gum is chosen from the group consisting of carrageenan, xanthan, locust bean gum, guar gum, cellulose, methycellulose, and mixtures thereof.

24. The product described in claim 16, wherein the fat-free cream cheese-like fermentation product further comprises an additive chosen from the group consisting of non-fat dry milk, preservatives, titanium dioxide, colorings, flavorings, and mixtures thereof.

25. The product described in claim 16, wherein the fat-free cream cheese-like fermentation product contains in situ produced exopolysaccharides and has a yield stress of about 8,000 to about 13,000 dynes/cm$^2$.

26. The product described in claim 16, further comprising manganese or a mixture of manganese and citrate.

27. A fat-free cream cheese-like fermentation product as prepared by a process comprising:

(i) providing a skim milk composition having a high solids content;

(ii) combining the skim milk composition with a source of fat to form a dairy mixture;

(iii) culturing the dairy mixture with a ropy culture until the pH reaches a value of about 5.2 to about 4.9 to form a first cultured mixture;

(iv) blending the first cultured mixture with at least one bulking agent and at least one emulsifiers to form a second cultured mixture;

(v) heating the second cultured mixture to a first temperature of about 60° C. to about 65° C. to form a third cultured mixture;

(vi) blending the third cultured mixture with a vegetable gum to form a fourth cultured mixture;

(vii) heating, with mixing, the fourth cultured mixture to a second temperature of about 80° C. to about 90° C. to form a fifth cultured mixture;

(viii) homogenizing the fifth cultured mixture to form the fat-free cream cheese-like product, wherein the fat-free cream cheese-like product does not include a cottage cheese component, wherein the fat content of the fat-free cream cheese-like product is less than about 1.5 percent.

* * * * *